Patented Sept. 13, 1927.

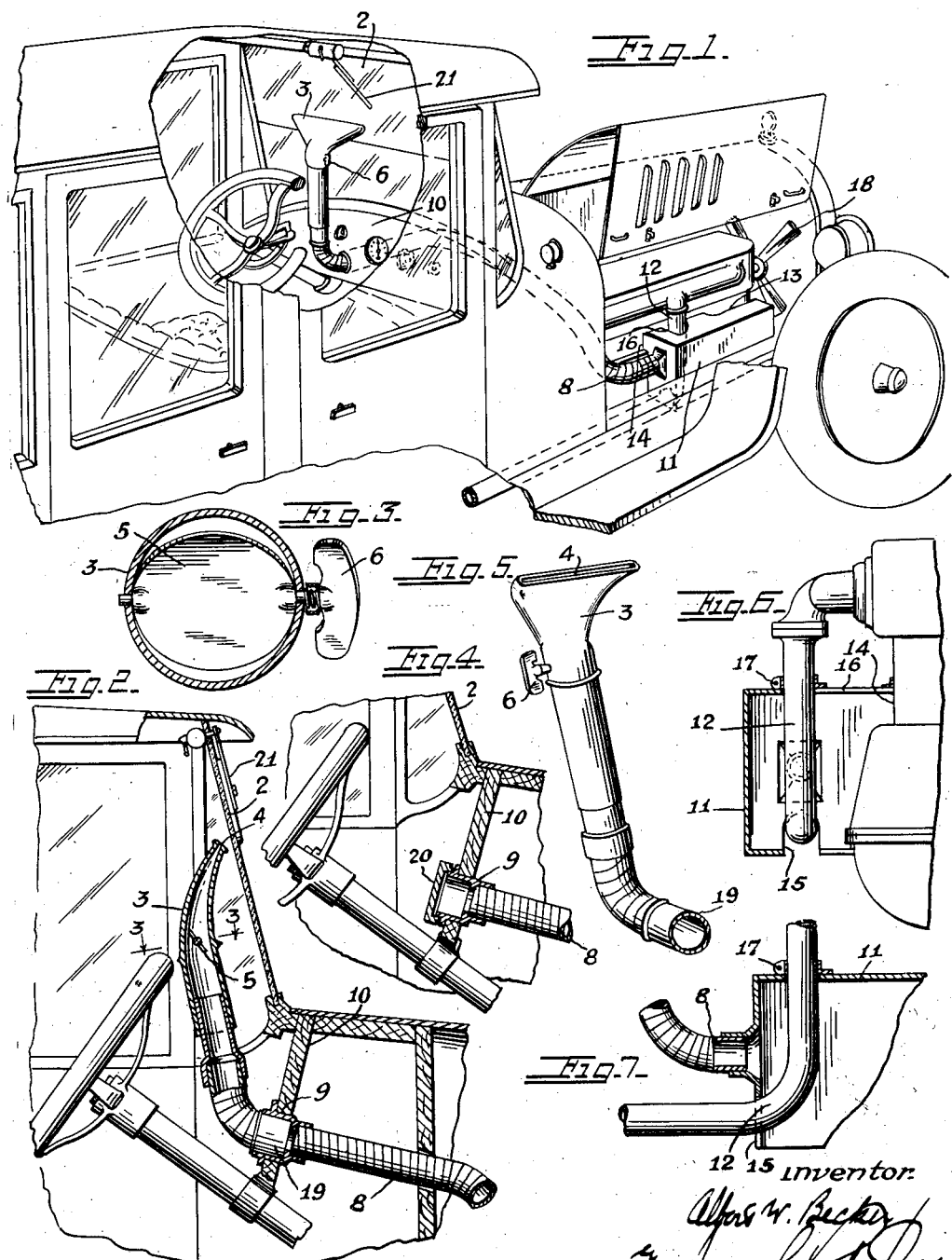

1,642,292

UNITED STATES PATENT OFFICE.

ALBERT W. BECKER, OF WINDSOR, CONNECTICUT.

HEATING ATTACHMENT.

Application filed January 26, 1925. Serial No. 4,945.

This invention relates to a heating attachment.

It has among its objects to provide an improved heating device adapted to be readily and cheaply supplied and readily connected or disconnected at will to an automobile or like device. A further object of my invention is to provide an improved heating device adapted during stormy weather to prevent the adherence of rain, snow or the like to a windshield. A still further object of my invention is to provide an improved device adapted to raise the temperature of the interior of a car or the like. Other objects and advantages of my improved construction will, however, hereinafter more fully appear.

In the drawing accompanying and forming part of the present specification, there is illustrated in detail an advantageous form of embodiment of the invention which will be set forth fully in the following description. I am not restricted to this disclosure. I may depart therefrom in a number of particulars within the scope of the invention defined by the claims succeeding such description.

Referring to said drawing:

Fig. 1 is a perspective view of the forward portion of an automobile and furnished with a device involving the invention, certain parts being omitted to facilitate illustration.

Fig. 2 is a side elevation.

Fig. 3 is a cross section on the line 3—3 of Fig. 2, looking downwardly.

Fig. 4 is a side elevation of the structure with the head removed.

Fig. 5 is a perspective view of the head.

Fig. 6 is a transverse sectional view of the heater.

Fig. 7 is a longitudinal sectional detail of the heater.

The auto involves a windshield, as 2, such as represented in Figs. 1 and 2. While the auto is in action, I direct against the windshield on the inner surface thereof a blast of warm air by which the adherence of ice and frost and sleet and such particles either exteriorly or interiorly of the windshield is positively precluded. The device involves a blast nozzle, as 3, having at its upper end a delivery mouth, as 4, which is preferably rather wide and arranged adjacent to the wind shield 2 as shown in said Fig. 2. The nozzle 3 is ordinarily of "T" shape and has near its base portion a valve 5 herein, of flat disc form, preferably furnished with a handle 6 to open and close the valve 5 by grasping the handle portion 6. The nozzle may be connected detachably with a flexible pipe 8 by a coupling 9, the pipe 8 extending through the instrument board 10, as shown in said Fig. 4.

The inlet end of said pipe 8, as shown, is connected with and extends from an improved heater, which fits over a suitable hot part of the engine, the same herein being disposed over a part of the exhaust manifold and readily accessible upon lifting the hood. In this illustrative construction, a heater 11 surrounds the exhaust pipe 12 of the engine and as a consequence warm or heated air is delivered in the pipe 8 and is conducted along said pipe where it is delivered against the windshield 2 by the slot or mouth 4 of the blast nozzle 3. The valve 5 may be opened its full extent, but ordinarily a small amount of hot air is sufficient merely to prevent the adherence of ice and such particles to the windshield under average weather conditions, the amount of opening of the valve depending upon the weather conditions and the amount of heating of the car which is desired. In a preferred form, the heater 11 extends to the front end of the car motor and is provided at its front end with a suitable large air inlet. Herein this inlet is in the form of a collector 13 formed by cutting away the heater body at the side adjacent the motor (Fig. 1) in such manner as to produce an effective collecting means. Moreover, it will be noted that the air collected by this inlet is thus caused to pass in a moving stream, whenever the car is in motion, through the heater 11 and out through the pipe 8 and nozzle 3, the same being heated as it flows by the pipe 12. As shown, the heater 11 is also adapted to be applied to and removed from the motor with facility, the same herein being provided with a suitably shaped side 14, herein an open side, adjacent the motor, adapted to fit snugly over and against the body of the motor, and also with slots 15 and 16 enabling it to be slipped over the horizontal and vertical parts, respectively, of the pipe 12 and rest upon the horizontal part thereof. It is also preferably adapted to be connected to the motor by quick detachable means functioning to clamp it in position thereon, these means being herein in the form of a collar 17 (Figs. 6 and 7) adjustable on the vertical part of the pipe 12 to clamp the heater in operative position against the cooperating parts heretofore mentioned.

While through the use of my improved collector 13, air will be supplied into the heater 11 and through its connected piping whenever the car is in motion, it will also be noted that herein the inlet 13 is so disposed that the usual motor fan 18 substantially augments the flow whenever the motor is operating, the inlet being so disposed relative to the fan that air is discharged or pumped by the fan directly into the inlet 13. Thus, the inlet and fan cooperate to produce an effective circulation of air, the air under all conditions flowing into the heater 11 and through the same and its connected piping without the necessity of providing any supplementary pumping means or connecting the same for operation by the motor.

It will also be noted that the nozzle 3 is provided with a coupling member 19 which is not only adapted to fit snugly within the member 9 in such manner as to cooperate with the latter in holding the nozzle in the desired upright position, but also to cooperate therewith in forming a swivel permitting the nozzle to be swung about the members 9 and 19 and held in any desired angular position. As a result of this construction it is made possible to swing the nozzle into or out of position very quickly and whenever desired. Further, it is made possible to utilize the device as a most effective car warming device when it is not needed as a windshield cleaning device, thereby substantially extend the period of use of the device. If the nozzle is swung angularly until it is adjacent the car bottom, it acts as an especially effective heater in the foot-space under the instrument board, while deflecting the air away from the driver's feet; the nozzle in this lower position acting to increase the heating effect to the maximum as the hot air then rises through the longest path. If preferred, the nozzle may also be pulled off, letting the hot air then discharge directly downward from its connected piping, though this step is not necessary. It will also be observed that, if desired, during the summer the nozzle and its connected piping may be withdrawn altogether, as for example by pulling out the coupling 19, a closure 20 then being fitted over the protruding end of the coupling 9. If it is also desired to remove the whole device during the summer, this likewise may be done readily and without in any way disturbing the motor, it only being necessary to release the collar 17 to permit the heater 11 to be taken off bodily, and the pipe 8 also being adapted to be readily pulled out from the member 9.

As a result of my invention, a very effective and simple glass clearing means is provided, the stream of heated atmospheric air acting upon the inside of the glass to prevent any accumulation thereon obscuring the driver's vision, and also so heating the glass as to prevent any accumulation of frozen material on the outside thereof and accordingly enable the outside wiper 21, shown in Figs. 1 and 2, to perform its function irrespective of the temperature. Attention is also directed to the fact that the mechanism requires the addition of no moving parts to the engine. The heater is also adapted to be readily applied to any desirable accessible hot part of the engine upon simply raising the hood. By utilizing a construction having a side fitting on the engine, it is also made possible quickly to connect the heater in position upon the selected heating surface with facility and without change in the engine construction. Further, by using a heater of the type described, and particularly one having an open side and held by simple clamping means, the cost of producing the same or connecting or disconnecting it is also minimized. By the provision of the inlet or collector at the end of the heater and at the front end of the motor, a sufficient supply of air is also insured conveniently and cheaply, and it is also made possible to utilize the ordinary motor fan as a means positively forcing the air into and through the heating system. The heater is further conveniently adapted to use at will either as a windshield cleaner, or as a car heater when not performing its cleaning function, thereby enabling it to be used throughout the winter season. These and other advantages of my improved construction will, however, be clearly apparent to those skilled in the art.

While I have in this application specifically described one embodiment which my invention may assume in practice, it will be understood that this is described for purposes of illustration, and that I am aware that certain of its features may be modified and embodied in various forms and applied to other motor driven vehicles or conveyances than automobiles and other windows thereof than windshields, it being my intention to include all such modifications within the scope of the appended claims.

What I claim is:

1. The combination of an automobile having a glazed surface, a nozzle, a heater, and means utilizing the motor fan for directing hot air through the heater to the nozzle onto the glazed surface.

2. The combination of an automobile, having a windshield, a heater heated by the heat generated by the exhaust manifold, the fan of the automobile directing hot air through the heater and a nozzel for directing the hot air against the windshield of the automobile and receiving the heated air from the heater.

3. A cleansing attachment for windshields comprising an air discharge disposable adjacent a windshield and supporting connections therefor including a swivel whereby the discharge may be adjusted angularly into or out of operative position at will.

4. The combination with a windshield and a support below the same, of an air discharge pivoted on the support and movable at will about its pivot into a windshield clearing position above the support or into a position below the support.

5. The combination with a windshield and a dash below the same, of a hot air discharge seated in the dash, and means for maintaining said discharge at will in windshield clearing position above the dash or in heating position below the dash.

6. The combination with a windshield and a dash below the same, of a hot air discharge pivoted on the dash and movable at will about its pivot into windshield clearing position above the dash or into heating position below the dash, said discharge being so connected at its pivot as to remain in either position of adjustment.

7. A heating attachment comprising a hot air discharge disposable adjacent a windshield and supporting connections therefor including provision whereby the discharge may be located in an upstanding position adjacent the windshield or disposed in a depending position to heat the space below the windshield.

8. In a heater for automotive vehicles, the combination with an internal combustion motor having a hood and an exhaust connection likewise under said hood, of a windshield and a heater clamped to said motor and fitting over said exhaust connection, said heater also having an atmospheric inlet so disposed as to create a flow of air through the heater and an outlet delivering along a surface of said windshield.

9. In a heater for automotive vehicles, the combination with an internal combustion motor having a motor fan at one end of the same and a driver's compartment spaced longitudinally from said motor said compartment having a windshield, of a heater delivering into said compartment and heated by the engine exhaust having atmospheric air inlet so disposed and connected that air is pumped by said fan through the heater and an outlet discharging into a surface of said windshield.

10. In a heater for automotive vehicles, the combination with an internal combustion motor having a motor fan at its front end and a driver's compartment in rear of said motor said compartment having a windshield, of a heater delivering into said compartment and heated by the engine exhaust said heater having an inlet and outlet so disposed and connected that air is pumped by said fan through the heater into said compartment and against the inner surface of said windshield.

11. In a heater for automotive vehicles, the combination with an internal combustion motor having a motor fan at its front end and a driver's compartment in rear of said motor, of a heater delivering into said compartment and heated by the engine exhaust having an inlet so disposed and connected that air is pumped by said fan through the heater into said compartment, a windshield for said compartment, and a swiveled discharge for said heater in said compartment and adjustable at will into cleaning position adjacent said windshield.

12. In a heater for automotive vehicles, the combination with an internal combustion motor having a motor fan at its front end, a heater in position on said motor over a heated part thereof and having an inlet in the delivery path of said fan so disposed that the latter pumps through said heater, a driver's compartment in rear of said motor having a windshield, a dash below said shield, piping connected to said heater and delivering the heated air to said dash, and a discharge swiveled on said dash and delivering at will to said windshield or to the space under said dash.

13. The combination with a motor driven conveyance having an internal combustion motor and a glass protecting the driver, of stationary means supplementary to and cooperating with said motor for keeping said glass clear under adverse weather conditions, including a heater having an inlet and an outlet so disposed as to provide during movement of said conveyance a constant flow of atmospheric air over a heated portion of said motor and its outlet so disposed as to discharge the heated air upon the inner surface of said glass.

14. The combination with a motor driven conveyance having an internal combustion motor and a glass protecting the driver and provided with an outside wiper, of means cooperating with said motor for keeping said glass clear and permitting said wiper to function under adverse weather conditions, including a heater having an inlet and and outlet so disposed as to provide during movement of said conveyance a constant flow of atmospheric air over a heated portion of said motor and its outlet so disposed as to discharge the heated air upon the inner surface of said glass.

In testimony whereof I affix my signature.

ALBERT W. BECKER.

CERTIFICATE OF CORRECTION.

Patent No. 1,642,292.   Granted September 13, 1927, to

ALBERT W. BECKER.

It is hereby certified that error appears in the printed specification of the above numbered patent requiring correction as follows: Page 1, line 57, after the word "herein" strike out the comma and insert the same to follow after "value 5" in the same line; page 2, lines 39 and 40, for the word "extend" read "extending"; same page, line 130, claim 2, for the misspelled word "nozzel" read "nozzle; page 3, line 52, claim 9, after the word "motor" insert a comma; line 55, after the word "having" insert the word "an", and line 58, for the word "into" read "onto"; same page, line 64, claim 10, after the word "motor" and line 66, after the word "exhaust" insert a comma; and that the said Letters Patent should be read with these corrections therein that the same may conform to the record of the case in the Patent Office.

Signed and sealed this 18th day of October, A. D. 1927.

Seal.

M. J. Moore,
Acting Commissioner of Patents.